April 30, 1940.   M. KLAVÍK   2,199,315
BODY FOR VEHICLES
Filed June 3, 1938
FIG. 1.
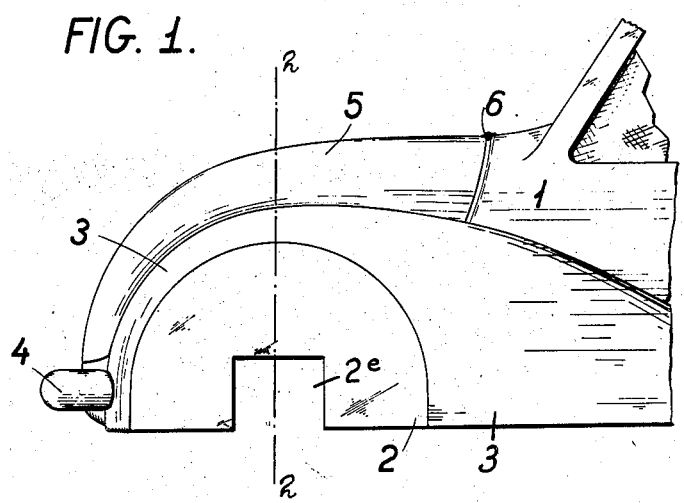
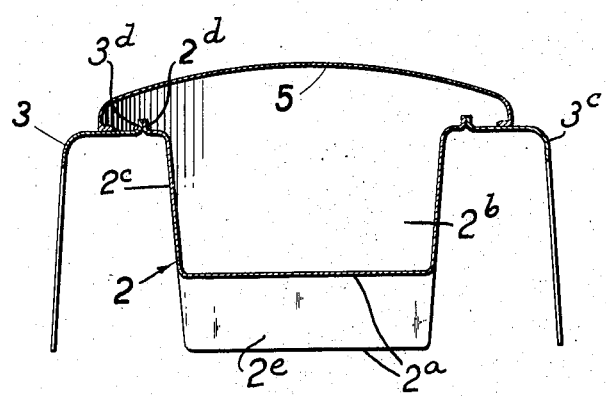
FIG. 2.
Inventor
Milos Klavík
By B. Singer, Atty Patented Apr. 30, 1940

2,199,315

UNITED STATES PATENT OFFICE 2,199,315

BODY FOR VEHICLES

Miloš Klavík, Koprivnice, Czechoslovakia

Application June 3, 1938, Serial No. 211,685
In Czechoslovakia June 3, 1937

1 Claim. (Cl. 296—37)

In the United States Patent No. 2,127,409 the design of the front part of the vehicle body, in particular of a streamline motor vehicle body, was described, this consisting in the front wall of the main passenger-carrying part of the body forming together with the two side plates and the bottom, a self-supporting box for taking spare wheels and the like, the two mudguards being welded on to the turned-up edges of this box which at the front are connected by a transverse wall.

The present invention refers to the arrangement of a cover with this kind of vehicle body, utilizing the design of the front part of the vehicle body according to the above-mentioned patent.

The invention consists in the cover not being confined to the dimensions of the box or body which it covers, but if desired also covering a greater or less part of the mudguards and extending downwards to the front bumper or the like so that the cover itself forms the actual shape of the front part of the vehicle body and may be manufactured as desired in various modified forms, the vehicle body and the mudguards always retaining the same shape.

This has the great advantage that with an alteration in shape of the vehicle body which, on account of a more modern appearance or preferably by the vehicle itself, appears necessary, only the cover is adapted to the new shape so that the already existing vehicle may be adapted to the new conditions by a simple exchange of the part which is easily and detachably connected with the actual vehicle body.

An example of carrying out the invention is shown diagrammatically in the accompanying drawing.

Figure 1 is an elevation of the arrangement of the front cover.

Figure 2 is a cross-section on the line 2—2 of Figure 1.

As shown in Fig. 1, the actual vehicle body I in front of the sitting room is extended forwardly to the box 2 on which the mud-guards are fitted. This form may be quite plain at the front edge, as in the case of the U. S. Patent No. 2,127,409 and as shown in Fig. 1; or may be provided with a bumper 4. The cover 5 closes not only the box 2, but extends also over a large part of the mud-guards 3. The result is attained by this arrangement that there may be mounted on the same box 2 and the mud-guards 3, by suspension by the hinges 6, any one of many differently designed covers 5, the form of which substantially alters the general appearance of the whole front part of the vehicle without altering the shape of the body I or box 2, or the mud-guards. The box 2 comprises a bottom 2ª, a back 2ᵇ, and sides 2ᶜ, which sides at the top extend laterally outwardly and have upturned flanges 2ᵈ which are joined to the flanges 3ᵈ of the flat tops 3ᶜ of the mud-guards 3. The box 2 has a recessed part 2ᵉ in the bottom as shown, to pass over the front axle (not shown) of the vehicle.

Fig. 2 shows to what extent the box 2 and the mud-guards can be covered by the cover 5, but this figure shows only one design of the cover section. Covers of other designs and cross sections may be used on the same machine if desired, thereby considerably altering the whole appearance of the vehicle.

I claim:

In a vehicle having a body with passenger room, and having mud-guards extending forwardly of the body and provided with flat tops having upstanding longitudinal flanges, a box located forwardly of said body and between the mud-guards and comprising a rear wall, a bottom, and side walls, said side walls having laterally outwardly extended flat portions with upstanding longitudinal flanges secured to the flanges of said mud-guards, and a cover hinged at its rear edge to said body and being of a width corresponding to that of the front of said body, said cover being shaped to the contour of said mud-guards and said front of said body and when closed resting with its side edges on the tops of said mud-guards to the outer side of said flanges and shaped to serve as a front wall and closure for said box, said box having a transverse recessed portion in the bottom for passing over the axle of the vehicle.

MILOŠ KLAVÍK.